United States Patent
Gibbens et al.

(10) Patent No.: US 9,587,694 B2
(45) Date of Patent: Mar. 7, 2017

(54) METHOD OF OPERATING A BRAKE

(71) Applicant: Meritor Heavy Vehicle Braking Systems (UK) Limited, Cwmbran, Gwent (GB)

(72) Inventors: Peter Gibbens, Gwent (GB); Prashant Narula, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 14/853,337

(22) Filed: Sep. 14, 2015

(65) Prior Publication Data
US 2016/0084330 A1 Mar. 24, 2016

(30) Foreign Application Priority Data

Sep. 18, 2014 (EP) .................................... 14185420

(51) Int. Cl.
*F16D 65/52* (2006.01)
*F16D 65/38* (2006.01)
(Continued)

(52) U.S. Cl.
CPC .......... *F16D 65/52* (2013.01); *F16D 55/225* (2013.01); *F16D 65/38* (2013.01);
(Continued)

(58) Field of Classification Search
CPC ........ F16D 65/52; F16D 65/38; F16D 55/225; F16D 2065/386; F16D 2066/003; F16D 2066/005; F16D 2066/006
(Continued)

(56) References Cited

U.S. PATENT DOCUMENTS

| | | | | |
|---|---|---|---|---|
| 4,926,980 A | * | 5/1990 | Cumming | F16D 65/60 188/196 BA |
| 2005/0199452 A1 | * | 9/2005 | Ward | F16D 55/224 188/71.7 |
| 2008/0202842 A1 | * | 8/2008 | Shevket | B60K 7/0015 180/442 |

FOREIGN PATENT DOCUMENTS

| DE | 19521401 C1 | 1/1997 |
|---|---|---|
| DE | 102005030621 A1 | 4/2006 |

(Continued)

OTHER PUBLICATIONS

European Patent Office, Extended European Search Report for the corresponding European Patent Application No. 14185420.8 mailed Mar. 2, 2015.

*Primary Examiner* — McDieunel Marc
*Assistant Examiner* — James E Stroud
(74) *Attorney, Agent, or Firm* — Brooks Kushman P.C.

(57) ABSTRACT

A method of operating a mechanically operated brake having an electric motor for operating an adjuster mechanism that may include the steps of:
 a) providing a brake rotor and friction material for selective engagement with the brake rotor,
 b) providing a target running clearance between the brake rotor and the friction material,
 c) applying the brake by forcing the friction material into engagement with the brake rotor,
 d) determining that the friction material is set in a compressed condition,
 e) releasing the brake,
 f) operating the electric motor to operate the adjuster mechanism to adjust the instantaneous running clearance towards the target running clearance,
 g) then applying the brake.

12 Claims, 1 Drawing Sheet

(51) Int. Cl.
*F16D 55/225* (2006.01)
*F16D 66/00* (2006.01)

(52) U.S. Cl.
CPC .. *F16D 2065/386* (2013.01); *F16D 2066/003* (2013.01); *F16D 2066/005* (2013.01); *F16D 2066/006* (2013.01)

(58) Field of Classification Search
USPC .......................................................... 701/70
See application file for complete search history.

(56) References Cited

FOREIGN PATENT DOCUMENTS

| | | | |
|---|---|---|---|
| EP | 0995923 | A2 | 4/2000 |
| EP | 2650556 | A1 | 10/2013 |
| WO | 9906725 | A2 | 2/1999 |

\* cited by examiner

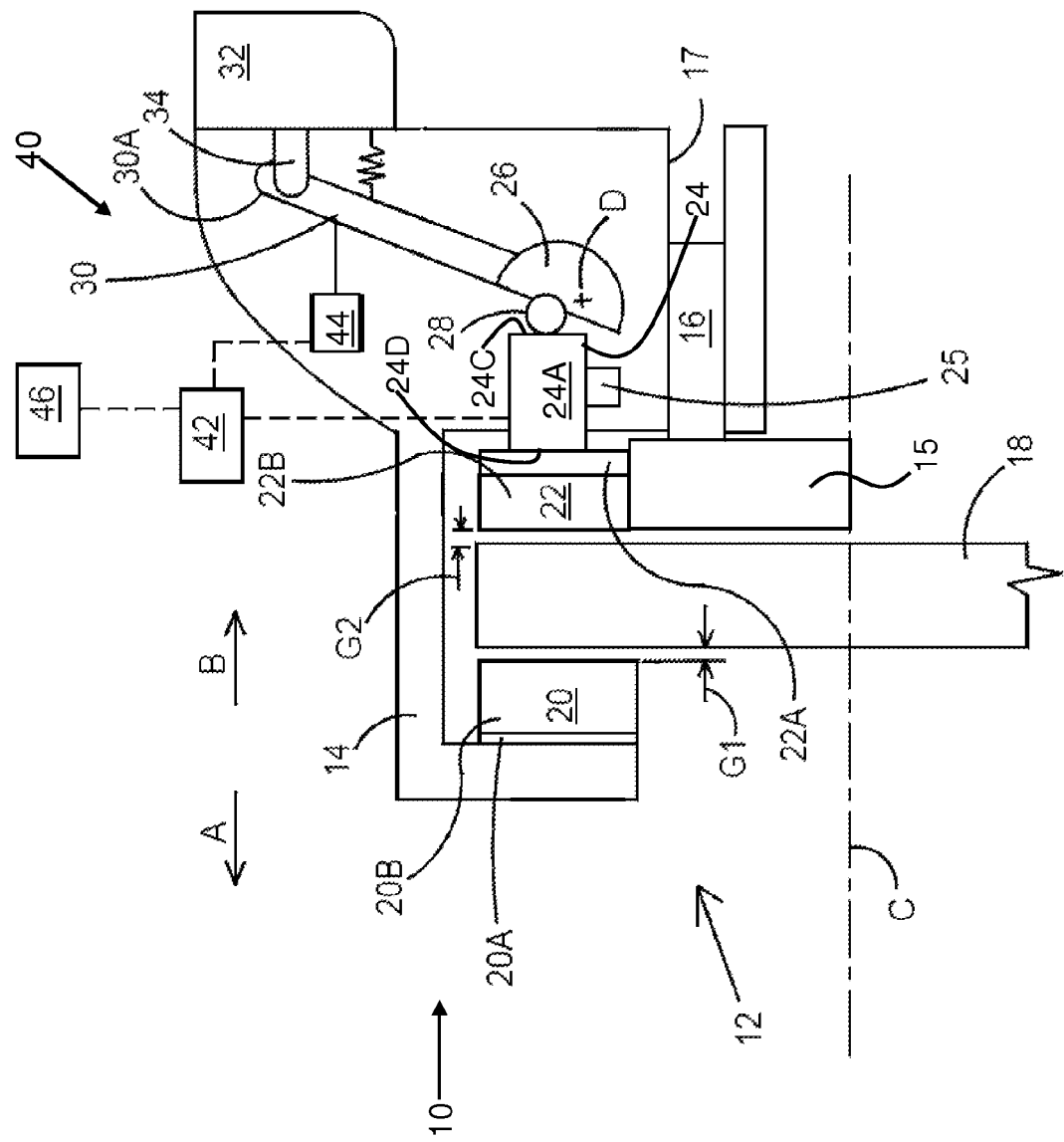

METHOD OF OPERATING A BRAKE

TECHNICAL FIELD

The present invention relates to a method of operating a brake, in particular a brake for land vehicle, in particular heavy land vehicles such as a truck or lorry or coach or bus.

BACKGROUND

Vehicle brakes are known whereby a brake rotor, such as a brake disc or a brake drum is attached to a vehicle wheel so as to rotate with that vehicle wheel. Non-rotating friction material, such as friction material on a brake pad or on a brake shoe can be frictionally engaged with the rotor so as to slow or stop the vehicle.

When it is not required to slow or stop the vehicle, the brake system is arranged so that a relatively small clearance, known as a running clearance, is provided between the rotor and the friction material. This running clearance is arranged to prevent brake drag. Brake drag is an unnecessary frictional drag, which causes increased fuel consumption, and increased wear of brake components. Accordingly, brake drag is undesirable.

WO99/06725 shows an example of a mechanically operated brake wherein the running clearance is automatically adjusted as the brake pads wear as a result of normal engagement and disengagement of the brake. WO99/06725 operates such that in the event there is excessive running clearance an initial movement of the brake pads towards the brake disc is caused solely by operation of an operating lever. Once the operating lever has passed through a predetermined distance (and the brake pads have not yet engaged the brake disc) then subsequent movement of the brake pads towards the brake disc is caused by a combination of the operating lever and the adjuster mechanism being adjusted to reduce the running clearance. Once the brake pad has engaged the brake disc the adjuster mechanism is unable to continue adjusting. As will be appreciated, adjustment of the brakes of WO99/06725 takes place as the brakes are being applied. This adjustment is in the direction which reduces the running clearance. WO99/06725 is not capable of automatically adjusting the brakes to increase the running clearance.

The automatic adjustment mechanism is designed to provide a predetermined running clearance for the brake. The running clearance is typically determined during the design process of the brake and depends upon various factors including rotor thickness, friction material thickness and other criteria of the brake assembly and associated vehicle.

One consideration when designing the running clearance is that the vehicle must be able to brake from its maximum speed or on a steep descent to a standstill and then, immediately be able to release the brakes and drive on. As will be appreciated, when a vehicle brakes from its maximum speed or on a steep descent to a standstill a considerable amount of kinetic energy is converted into heat energy by the brakes. This heat energy causes various brake components to heat up and therefore expand. In particular, where the brake is a disc brake, the brake disc and the friction material of the brake pads will expand. This expansion may cause the running clearance of a hot brake to be smaller than the running clearance of a cool brake. Accordingly, the normal cool running clearance of a brake must be sufficiently large such that when the brake becomes hot (for example after being braked to a standstill from a maximum running speed of the associated vehicle) there still exists a running clearance to enable the vehicle to continue its journey. If the cool running clearance is too small, when the vehicle has braked to a standstill from its maximum speed, the friction material may expand into engagement with the rotor, and the vehicle will be unable to continue its journey, until such time as the brake components have cooled down, or there may be drag which will be undesirable.

However, when brakes which have a running clearance are applied, the friction material has to be moved over the distance of the running clearance before any braking force is applied to the rotor. Thus there is a short time delay between when the brake pads start to move, and when they start to apply a braking force.

Accordingly, in known brake designs the running clearance must be sufficient to ensure a running clearance when the brake is both hot and cool and to ensure that brake drag does not occur, but must not be so large so as to cause a significant time delay between when the brake pads start to move and when a brake force is applied to the rotor.

With pneumatically operated mechanically adjusted brakes a particular problem can occur when the vehicle is parked with hot brakes. Certain types of friction material are compressible and the compressibility increases with temperature. Therefore, when the vehicle is parked with hot brakes, i.e. the parking brake is applied whilst the friction material and the rotor is hot, the friction material is compressed to a thickness less than it would have been had the vehicle been parked whilst the friction material and rotor were cold and this is in spite of the fact that the friction material, in an uncompressed form, typically expands as the temperature increases. As the friction material and rotor cools, for example over night when the vehicle is not being used, the friction material remains in this compressed state. When the park brake is released at a cool ambient temperature, the friction material does not immediately return back to its original thickness, rather it remains "set" in a compressed state, and this is in spite of the fact that since the park brake is no longer applied, there is no compression force on the friction material. In one example, the change in running clearance may be 0.7 mm (i.e. 0.35 mm per brake disc pad). Furthermore, the rotor will have cooled and where the rotor is a disc, the disc will have become thinner due to the thermal contraction of the disc material as it cools.

The net result of the cool rotor and the cool friction material being in a "set" compressed condition is that when the park brake is released the running clearance will be increased. The adjuster mechanism may detect this increase in running clearance and therefore adjust so as to reduce the running clearance to the desired running clearance.

However, as the brake is used the friction material goes through a thermal cycle upon each application of the brake and this "conditioning" of the friction material causes the "set" to be released thereby causing the friction material to expand (or swell). Note this expansion is in addition to any expansion caused by the increase in temperature of the friction material. "Conditioning" typically requires several (a plurality) of applications and releases of the brake. However, the adjustment of the brake typically occurs during the first application of the brake, in particular as the running clearance is being closed for the first time after release of the park brake. In other words adjustment of the brake occurs prior to "conditioning" of the friction material. Because of the order in which the adjustment and the "conditioning" takes place, this can result in a brake having a correct running clearance when the friction material is 'set' in a compressed condition, but after conditioning this running clearance becomes too small, or potentially non-existent as the friction material expands during the conditioning process. Clearly, if the actual running clearance reduces to zero, then brake drag occurs causing heat which in turn causes expansion of the friction material and the rotor which causes further brake drag, further heat, further expansion etc. Clearly such a situation is undesirable. Note that in this situation, whilst the operator may not be applying the brake in the sense of the operator's foot will not be on the brake pedal or the like, nevertheless the brake is applied in the sense of the friction material is in rubbing engagement with the rotor causing significant drag on the rotor.

In particular, this situation applies to mechanically (e.g. pneumatically) operated disc brakes having mechanical adjusters since the mechanical adjusters are only capable of operating to reduce the running clearance and are incapable of increasing the running clearance.

Conditions in which friction material takes a compression set may cause alternative issues with mechanically (e.g. pneumatically) operated brakes wherein adjustment is carried out by electrical means, such as electric motors. In order to save weight and cost, the electric motors are sized such that they are only capable of adjusting a running clearance when the brake is not applied. When the brake is applied, since the force of application of the brake passes through the adjuster mechanism, then the internal friction of the adjuster mechanism increases significantly, to such an extent that electric motor cannot adjust the brake.

EP2650556 shows an example of an electrically actuated adjuster mechanism which endeavors to maintain a constant running clearance. EP2650556 is a mechanically operated brake, i.e. a mechanical actuator, in this case an air actuator operates to apply the brake. EP2650556 is not an electrically actuated brake, i.e. it does not include an electric motor which applies braking force. The adjuster mechanism of EP2650556 is a distinct component from the actuator of EP2650556. The actuator performs the function of applying and releasing the brake. The adjuster mechanism performs the function of adjusting (in particular the running clearance) of the brake. The adjuster mechanism is not used to apply the brake. The actuator mechanism is not used to adjust the running clearance of the brake. The actuator is an air operated actuator but other types of mechanical actuator may be used. The adjuster mechanism is electrically operated, i.e. in order to adjust the adjuster mechanism the electric motor must be operated.

In one embodiment the system of EP2650556 determines an amount of running clearance as the brake is applied. Upon subsequent release of the brake an appropriate adjustment to the running clearance is made. Thus, in this particular embodiment, no adjustment of the brake is made during application of the brake, rather it is made after the brake has been released. If the brake is released after the friction material has taken a compressed set, the instantaneous running clearance will be larger than the expected running clearance by an amount equal to the amount of compression set of the friction material. However, the brakes will need to be re-applied, in order to determine the instantaneous running clearance, and then upon further release of the brakes is the adjustment then made.

For the avoidance of doubt, the amount of wear of friction material during conditioning is negligible, and can be ignored for the present purposes. In one example, the majority of conditioning takes place between the first and tenth applications of the brake following the vehicle being parked overnight, e.g. in the first few minutes of operation of the vehicle.

SUMMARY

Thus, one object of the present invention is to provide an improved mechanically operated, electrically adjusted brake.

Thus, according to the present invention there is provided a method of operating a mechanically operated brake having an electric motor for operating an adjuster mechanism including the steps of:
 a) providing a brake rotor and friction material for selective engagement with the brake rotor,
 b) providing a target running clearance between the brake rotor and the friction material,
 c) applying the brake by forcing the friction material into engagement with the brake rotor,
 d) determining that the friction material is set in a compressed condition,
 e) releasing the brake,
 f) operating the electric motor to operate the adjuster mechanism to adjust an instantaneous running clearance towards the target running clearance,
 g) then applying the brake.

Step c) may include determining an amount of adjustment required prior to applying the brake. Step c) may include determining an amount of movement of the friction material from an unbraked condition to a condition at which the clearance between the friction material and the rotor is zero but where the brakes are not applied.

BRIEF DESCRIPTION OF THE DRAWINGS

The invention will now be described, by way of example only, with reference to the accompanying drawings in which:

FIG. 1 shows a brake system according to the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1 there is shown a vehicle 10 having a brake 12. The brake 12 includes a caliper 14 which is slidably mounted via pins 16 (only one shown) on a brake carrier 15. Brake carrier 15 is mounted on the vehicle 10, typically on a suspension component of the vehicle 10. Accordingly the caliper 14 can move in the direction of arrow A and in the direction of arrow B.

The vehicle 10 includes a brake rotor, in this case a brake disc 18 which is rotatably mounted about axis C. The brake disc 18 is rotatably fast with a wheel (not shown) which also rotates about axis C.

On opposite axial sides of the brake disc there are brake pads 20 and 22. Brake pad 20 includes a brake pad back plate 20A and friction material 20B. Brake pad 22 includes a brake pad back plate 22A and friction material 22B.

Adjacent brake pad 22 is an adjuster mechanism 24. The adjuster mechanism includes a thrust assembly 24A and an adjuster system operable to change the length of the thrust assembly. The thrust assemblies shown in EP0995923 and EP1000263 are suitable for use in the present invention. An actuation shaft (or operating shaft) 26 is mounted in the caliper 14 and is rotatable about axis D. A roller 28 is supported on the actuation shaft 26 and engages a right hand end (when viewing FIG. 1) of the thrust assembly 24A.

Operating lever 30 is attached to the actuation shaft 26. An actuator 32 is mounted on the caliper 14, and includes an actuator rod 34, which engages an end 30A of the actuating lever 30.

The actuator 32 is a mechanically operated actuator, in this case an air operated actuator e.g. a pneumatically operated actuator.

As shown in FIG. 1 the brakes are in a released condition, operating lever 30 having being rotated clockwise about axis D such that a gap G1 exists between brake pad 20 and brake disc 18 and a gap G2 exists between brake pad 22 and brake disc 18. Accordingly, the running clearance is G1+G2.

In order to apply the brakes the actuator 32 is operated such that the actuator rod extends from the actuator and moves in a direction of arrow A thereby rotating the operating shaft 26 anti-clockwise about axis D. Because the roller 28 is offset from axis D, the roller 28 moves in the direction of arrow A which causes the thrust assembly 24A to move in a direction of A which forces the brake pad 22 in the direction of arrow A, thereby closing the gap G2. Continued anti-clockwise rotation of the operating shaft 26 then causes the caliper 14 to move in the direction of arrow B as the hole 17 in the caliper slides on pin 16. This causes gap G1 to close. At this moment the gaps G1 and G2 have been closed but, because the brake pads are not being forced against the brake disc 18, no braking force exists to retard to slow the vehicle. Only when the actuator 32 continues to move the actuator rod 34 in the direction of arrow A, does a clamping force of the brake pads on the discs start to be generated. The clamping (or braking) force is dependent upon, amongst other things, the force in the actuating rod 34, a higher force actuating rod 34 resulting in a higher clamping force and therefore a higher retardation of the vehicle.

The adjuster mechanism 24 is electrically operated by electric motor 25. Thus the thrust assembly 24A can be extended (or lengthened) (such that end 24C moves away from end 24D) or retracted (or shortened) (such that end 24C moves towards end 24D) by operation of the electric motor 25. It will be appreciated that by extending the thrust assembly 24A the running clearance will reduce and by retracting (or shortening) the thrust assembly 24A the running clearance will increase.

As will be appreciated, the adjuster mechanism 24 is a distinct component from the actuator 32. The actuator 32 performs the function of applying and releasing the brake. The adjuster mechanism 24 performs the function of adjusting (in particular the running clearance) of the brake. The adjuster mechanism is not used to apply the brake. The actuator mechanism is not used to adjust the running clearance of the brake. The actuator 32 is an air operated actuator though other types of mechanical actuator may be used. The adjuster mechanism 24 is electrically operated, i.e. in order to adjust the adjuster mechanism the electric motor 25 must be operated.

The vehicle 10 includes a control system 40, the control system includes a sensor system 44, a processor 42, in one embodiment a microprocessor. There is also included a memory 46 such as data storage, such as flash memory.

In summary, the control system determines situations where the friction material may be in a set compressed condition. If there is a determination that the friction material is set in a compressed condition when the brakes are released (typically from a park condition) the control system determines the instantaneous current running clearance. The control system then makes an adjustment by operating the motor 25 to operate the adjuster mechanism 24 thereby, in this example, reducing the running clearance. The running clearance may be reduced to a target running clearance, or alternatively the running clearance may be reduced towards (but not all the way to) a target running clearance. This adjustment typically takes place soon after the brakes are released, and in particular before a further application of the brakes. Thus, the adjustment may take place within five seconds of the brakes being released, or preferably within one second of the brakes being released.

A target running clearance may be stored in memory 46. The target running clearance may be a single target running clearance or the target running clearance may be variable, depending upon the operating conditions or environment of the vehicle.

Any known way of determining the current running clearance can be used. For example, the sensor system 44 may include position sensors and load sensors to determine when the brake is in a released condition and to determine when gaps G1 and G2 have just been closed.

Circumstances wherein friction material will be set in a compressed condition is determined by many variables including:

a) The temperature of the friction material and/or rotor at the time of applying the brake, in particular the park brake. The higher the temperature, then the more likely the friction material may become set in a compressed condition.

b) An elapsed time since applying the brake. Thus, if the brake has been applied overnight for several hours, then the friction material is more likely to be set in a compressed condition. However, if the brake has only been applied for a few minutes, for example whilst waiting for traffic lights to change, then friction material is less likely to be set in a compressed condition.

c) A time since releasing the brake. Some friction material "self-conditions" i.e. upon release of the brake, whilst the friction material does not immediately expand, over a period of time, the friction material will naturally expand of its own volition.

d) A type of friction material. Certain friction materials have a greater tendency to be set in a compressed condition whereas other types of friction material have a lesser tendency to be set in a compressed condition.

e) A force of engagement between the friction material and the brake rotor. Clearly the greater the force of engagement between the friction material and the rotor then the greater the likelihood of the friction material becoming set in the compressed condition.

Thus, the control system can make a determination that the friction material is set in a compressed condition.

The control system can also determine how much of a set has been taken and again this is dependent upon many factors including the factors listed above. However, additionally the thickness of the friction material will determine how much set the friction material will take and hence how much they will expand or swell during subsequent conditioning. Thus, new brake pads (where the thickness of the friction material is at a maximum) may take a larger set and hence expand during conditioning by X millimeters. However, when the friction material is half worn, the set taken and hence the expansion due to conditioning will be approximately X/2. Similarly, when the friction material is nearly worn out, then the set taken and hence the expansion due to conditioning may be negligible.

The control system 40 can determine the amount of wear of the friction material by determining the total amount of adjustment of the adjuster mechanism 24, since new pads were installed in the brake.

Clearly, as conditioning occurs, friction material will start to increase in thickness and the adjuster mechanism can compensate for this, in particular by increasing the instantaneous running clearance in response to increasing of the thickness of the friction material.

The invention has being described in relation to disc brakes but is also applicable to other types of brake, such as brakes having brake drums.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a mechanically operated brake having an electric motor for operating an adjuster mechanism comprising the steps of:
   a) providing a brake rotor and friction material for selective engagement with the brake rotor;
   b) providing a target running clearance between the brake rotor and the friction material with an electronic controller;
   c) applying the brake by forcing the friction material into engagement with the brake rotor;
   d) determining with the electronic controller that the friction material is set in a compressed condition;
   e) releasing the brake;
   f) operating the electric motor with the electronic controller to operate the adjuster mechanism to adjust an instantaneous running clearance towards the target running clearance; and
   g) then applying the brake.

2. The method of claim 1 wherein step d) is based on one or more of:
   i) a previous temperature of a brake component at a time of applying the brake in step c),
   ii) an elapsed time since applying the brake in step c),
   iii) a force of engagement between the brake rotor and the friction material during application of the brake in step c),
   iv) a thickness of the friction material, and
   v) a type of friction material.

3. The method of claim 1 in which step d) includes determining an amount of set of the friction material.

4. The method of claim 3 in which an amount of adjustment in step f) is based on the amount of set of the friction material determined by step d).

5. The method of claim 1 wherein step d) occurs before step e).

6. The method of claim 1 wherein step e) occurs before step d).

7. The method of claim 6 wherein step d) is based on at least a time since releasing the brake at step e).

8. The method of claim 1 wherein step f) occurs after step e).

9. The method of claim 8 wherein step f) occurs within five seconds after step e).

10. The method of claim 8 wherein step f) occurs within one second after step e).

11. The method of claim 1 including the step of:
    h) after step g) the brake is released and applied a plurality of times to condition the friction material such that it is not set in the compressed condition.

12. The method of claim 11 wherein during step h) the electric motor is selectively operated to operate the adjuster mechanism to adjust the instantaneous running clearance towards the target running clearance as conditioning of the friction material occurs.

* * * * *